Figure 1:
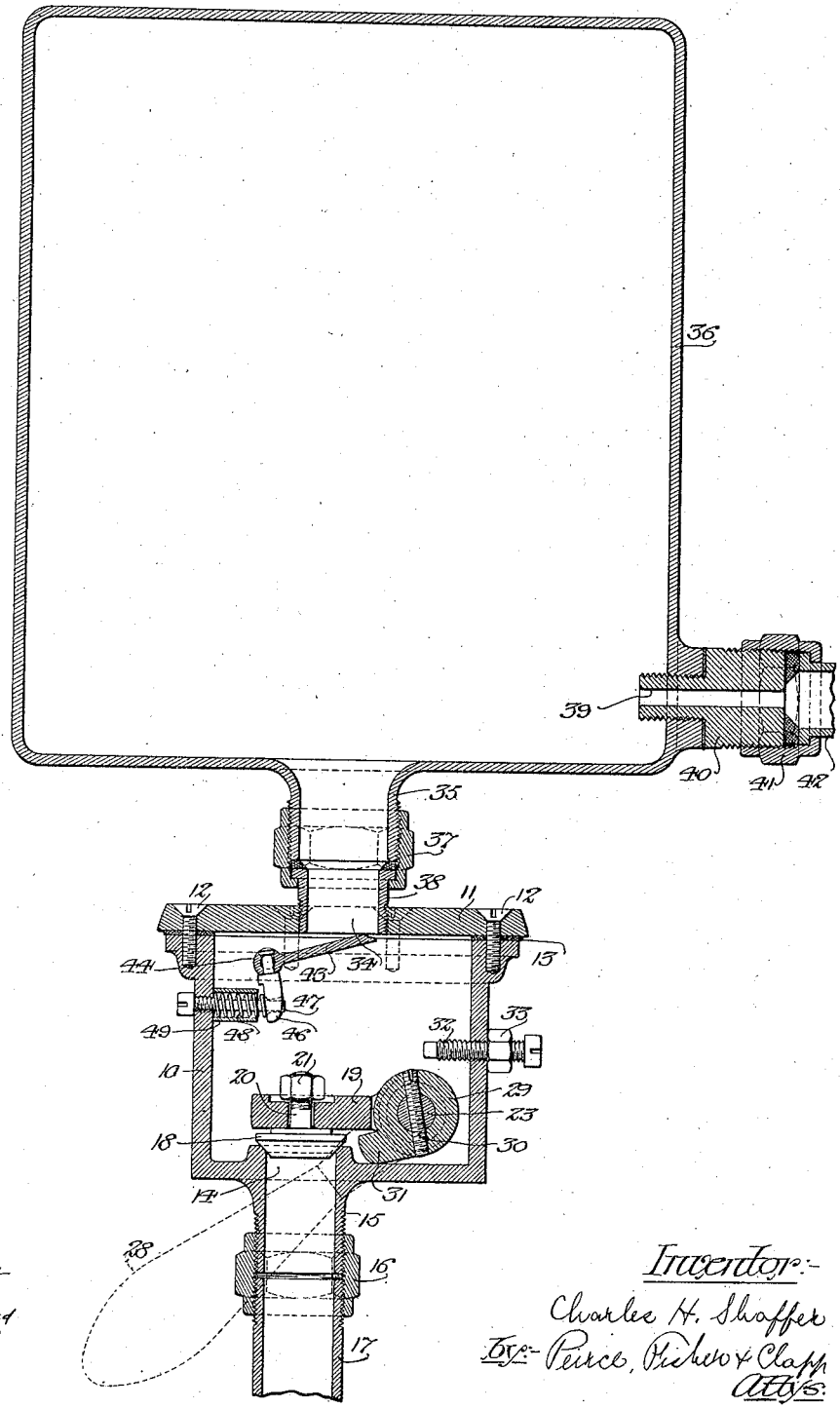

C. H. SHAFFER.
FLUSHING VALVE.
APPLICATION FILED SEPT. 25, 1915.

1,179,462.

Patented Apr. 18, 1916.
2 SHEETS—SHEET 1.

Witness:-

Inventor:-
Charles H. Shaffer
By- Peirce, Fisher & Clapp
Attys.

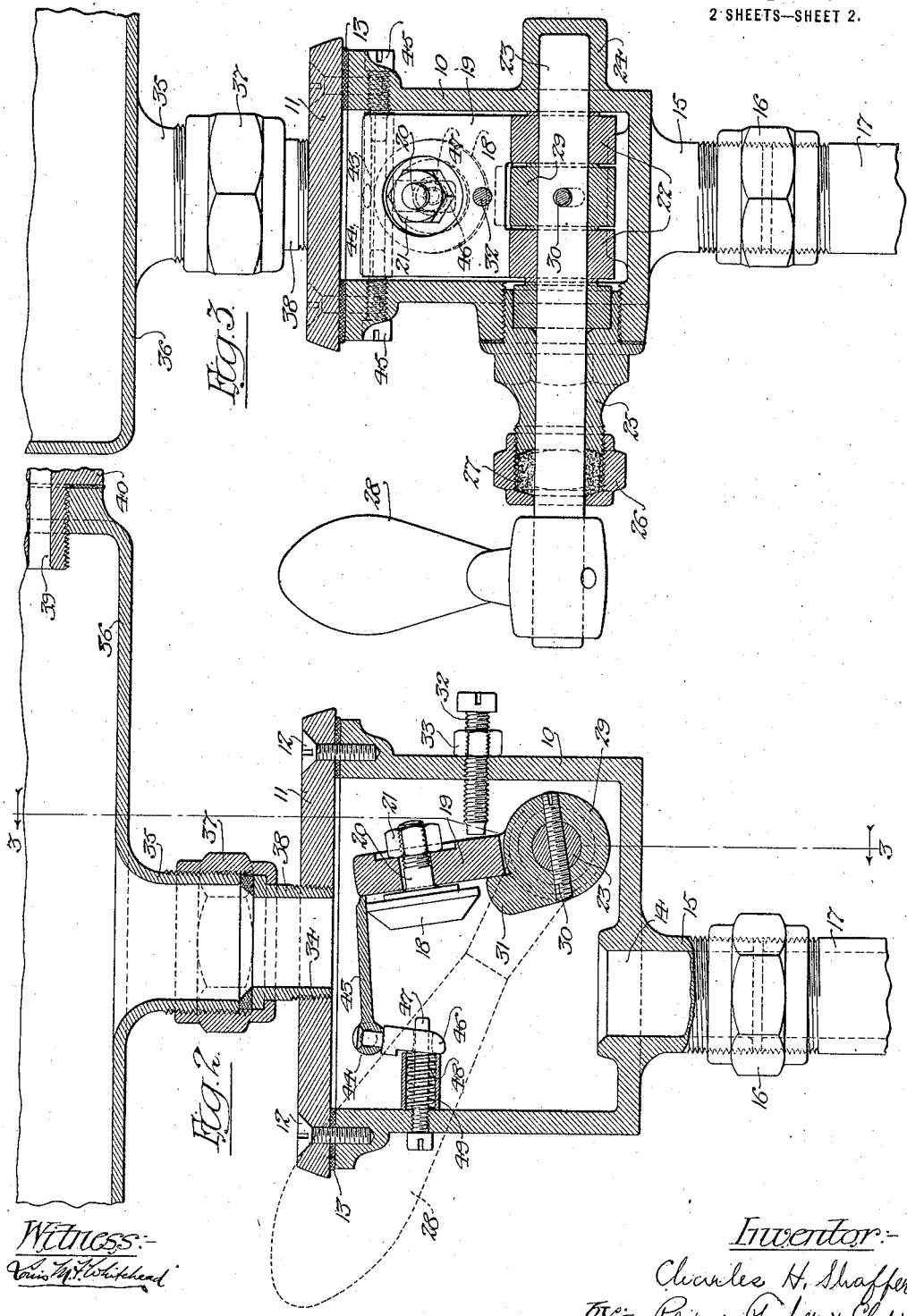

UNITED STATES PATENT OFFICE.

CHARLES H. SHAFFER, OF MUSKEGON, MICHIGAN, ASSIGNOR OF ONE-HALF TO HAZLETT M. HARDY, OF MUSKEGON, MICHIGAN.

FLUSHING-VALVE.

1,179,462.  Specification of Letters Patent.  Patented Apr. 18, 1916.

Application filed September 25, 1915. Serial No. 52,607.

*To all whom it may concern:*

Be it known that I, CHARLES H. SHAFFER, a citizen of the United States, and a resident of Muskegon, Muskegon county, and State of Michigan, have invented certain new and useful Improvements in Flushing-Valves, of which the following is a full, clear, and exact description.

The invention relates to flushing valves for water closet bowls and seeks to provide a simple, effective construction which eliminates the necessity of employing a float-controlled inlet valve or the like, and which also eliminates the necessity of employing dashpots, diaphragms and the like for controlling the closing movement of the flushing valve and which parts are liable to get out of order.

The invention consists in the features of construction hereinafter set forth, illustrated in the preferred form in the accompanying drawings and more particularly pointed out in the appended claims.

Figure 1 is a view in vertical section of the improved valve. Fig. 2 is a similar view on an enlarged scale, showing the valve in open position. Fig. 3 is a detailed section on the line 3—3 of Fig. 2.

The valve casing 10 may be of any suitable form. That shown in the drawing is a small, box-like casing provided at its upper end with a cover plate 11 held in place by screws 12. Packing 13 is interposed between the cover plate and the upper edge of the casing 10. At its lower portion the valve casing is provided with an outlet port 14 which communicates with a depending nipple 15. The latter, in the form shown, is connected by a coupling 16 to a pipe 17 that leads to the closet bowl.

The outlet port 14 is normally closed by a check valve 18, which is preferably mounted on a swinging arm 19. The valve is provided with a short stem 20 which extends loosely through an opening in the arm 19 and is provided at its upper end with a nut or collar 21. Inasmuch as the valve is loosely mounted on the arm, it will always snugly engage its seat at the discharge port 14. One end of the valve supporting arm 19 is bifurcated and is provided with hub portions 22 (see Fig. 3) which are loosely mounted on a shaft 23. One end of the shaft is journaled in a boss 24 formed upon one of the side walls of the casing 10 and the opposite end extends through a stuffing box 25 which is threaded into an opening in the opposite side wall of the casing. A gland 26 threaded on the stuffing box holds packing 27 in place about the shaft 23. The projecting end of the shaft is provided with an operating handle 28.

A hub 29 is mounted on the shaft between the hubs 22 and is secured thereto by a key or screw 30. This hub is provided with a lug 31 which extends beneath the arm or apron 19 upon which the valve is mounted. Normally the lug 31, as shown in Fig. 1, rests upon the bottom of the valve casing, but by operating the shaft 28 and valve 23, the lug is brought into engagement with the arm or apron 19 to open the valve 18. The opening movement of the valve is limited by the engagement of the arm or apron 19 with a stop screw 32 which is adjustably threaded through one of the side walls of the casing 10 and which is held in adjusted position by a jamb 33. This stop screw is arranged to arrest the opening movement of the valve 18 and arm 19 before the latter reaches a position directly above the axis of the shaft 23 and the arm or apron 19 is made quite thick and heavy so that, under the influence of gravity, it will readily fall from its open position shown in Fig. 2 to its normal, closed position shown in Fig. 1. Means is, however, provided for temporarily holding the valve in open position so that the closet bowl can be effectually flushed. For this purpose, means is provided for effecting the flow of water through the valve casing, when the valve is open, with gradually diminishing force, and means automatically actuated by the flow of water through the casing is arranged to control the closing of the valve.

To effect the flow of water through the valve casing with an initial high pressure and with a gradually diminishing force, the inlet port 34 of the valve casing, and which, in the construction shown, is formed in the cover plate 11, is connected to the discharge outlet nipple 35 of a small, closed tank 36. In the construction shown, the discharge outlet nipple 35 of the tank is connected by a coupling 37 to a short pipe 38, which in turn is threaded into the inlet port 34 of the valve casing. The discharge outlet nipple of the tank is arranged at its lower end, and the lower end portion of the tank is also provided with a relatively small or contracted inlet passage 39, which, in the construction shown, is formed in a plug 40 threaded into an opening in the lower end of the tank, the plug 40 being connected by a coupling 41 to a supply pipe 42. The inlet passage 39, as stated, is relatively small and is always open, and the water flows therethrough into the tank and into the valve casing and rises in the closed tank, thus compressing the air therein until the pressure within the tank equals the pressure of the water supply.

When the flushing valve is opened, the water in the tank and valve casing is forced through the port 14 and pipe 17 under considerable force to effectually flush the closet bowl, but, as the tank is emptied, the pressure gradually diminishes and the last portion of the water runs slowly and thus acts to properly refill the bowl.

The flow of water under gradually diminishing force is also arranged to temporarily hold the valve in open position. For this purpose, a catch, which is preferably in the form of a pivoted plate 43, is arranged within the valve casing adjacent the inlet port 34. The plate is provided at one edge with a hub portion 44, which is mounted upon a pair of pivoted screws 45 (see Fig. 3) which are threaded through the side walls of the valve casing. The catch plate 43 is yieldingly held by a counter balancing spring or weight in inoperative position, out of the path of movement of the valve-supporting arm or apron 19. In the form shown, the pivoted edge or hub 44 of the catch plate is provided with a depending arm 46 having an opening therein through which a pin 47 extends, the latter being threaded through the wall of the valve casing. A spring coiled about the pin extends between the arm 46 and the valve casing, and normally holds the catch plate in inoperative position and in engagement with the cover plate 11, as shown in Fig. 1. A short sleeve 49 surrounds the spring 48 and is arranged to abut against the arm 46 and limit the movement of the catch plate from its normal position.

When the valve 18 is closed and the parts are in normal position, the water enters the contracted inlet 39 of the tank, as described, and the air therein is compressed in the upper portion of the tank until the pressure in the latter equals the pressure of the water supply. The valve is opened by means of the handle 28, which turns the shaft 23 and brings the lug 31 into engagement with the arm or apron 19 on which the valve is mounted. As soon as this occurs, the water is forced with considerable force from the tank through the discharge outlet 35 thereof and valve casing and through the discharge nipple 15 and pipe 17 into the closet bowl to flush the same. The catch plate 43 extends across and is arranged just below the inlet port 34 of the valve casing and the flow of water therethrough depresses the catch plate to the position shown in Fig. 2. As the valve approaches its full open position, the arm or apron 19 strikes the catch plate 43, lifts the latter and moves past its edge. The catch plate is then again depressed and engages the upper edge of the arm or apron 19, as shown in Fig. 2, and this locks and holds the valve in open position. The catch plate is thus held in its operative position until practically all the water in the tank 36 is forced out by the compressed air contained therein. The catch plate is then returned to normal, inoperative position by the spring 38, the valve is closed by gravity, and the tank and valve casing are again filled through the contracted supply discharge 39.

The improved construction obviates the necessity of employing a float-controlled or other inlet valve, and also eliminates dash-pots, diaphragms and the like, for controlling the closing movement of the flushing valve. The improved construction also operates with a small amount of water, since the first portion of the water is discharged under high pressure to thoroughly flush the bowl and, as the pressure gradually diminishes, the last portion of the water runs slowly and effects a perfect refill of the bowl.

It is obvious that changes may be made in the details of the construction without departure from the essentials of the invention as defined in the claims.

I claim as my invention:

1. In a flushing valve, the combination with a casing having a discharge port, of a valve on the inlet side of said discharge port, means for manually opening said valve, an automatic catch arranged in said casing on the inlet side of said discharge port and arranged to be held in operative position by the flow of water through said casing to thereby positively lock said valve in its open position, and means, independent of said valve, for counterbalancing said catch device and shifting the latter to its inoperative position out of engagement with said valve.

2. In a flushing valve, the combination with a valve casing having a discharge port, a valve on the inlet side of said discharge port, means for opening said valve, means for effecting the flow of water through said casing with gradually diminishing force, a catch arranged to be held in operative position by the flow of water through said casing to thereby engage and positively lock said valve in open position, and counterbalancing means, independent of said valve, for shifting said catch to inoperative position out of engagement with said valve.

3. In a flushing valve, the combination with a valve and a valve casing, of manually operable means for opening said valve, a closed tank communicating with said casing and having a supply inlet at its lower end of less area in cross section than the outlet through the casing, whereby water flows from said tank through said casing with gradually diminishing force when said valve is open, an automatic catch shiftable transversely to the path of movement of said valve into and out of operative position, said catch being arranged to be held in operative position by the flow of water through said casing to thereby engage and positively lock said valve in its open position, and counterbalancing means, independent of said valve, for shifting said catch to its inoperative position when the flow of water through said casing is diminished to a certain predetermined point.

4. In a flushing valve, the combination with an inclosing casing having inlet and outlet ports, of a valve arranged within said casing for controlling said outlet port, means for manually opening said valve, a closed tank having at its lower end a discharge passage communicating with the inlet port of said valve casing, and a relatively smaller supply passage whereby water flows from said tank through said casing with gradually diminishing force when said valve is open, and a counterbalanced catch device normally held in operative position out of engagement with said valve, but arranged to be held by the flow of water through said casing in operative position in engagement with said valve to positively lock the latter in its open position.

5. In a flushing valve, the combination with a casing having inlet and outlet ports and a valve arranged within said casing and coöperating with said outlet port, of means for opening said valve, an automatic catch for positively holding said valve in open position, and means, independent of said valve, for counterbalancing said catch and thereby yieldingly holding the same in its normal inoperative position, said catch being arranged within said casing and adapted to be shifted and temporarily held in operative position by the flow of water therethrough.

6. In a flushing valve, the combination with a casing having inlet and outlet ports and a valve arranged within said casing and coöperating with said outlet port, of means for opening said valve, an automatic catch for positively holding said valve in open position, and means, independent of said valve, for counterbalancing said catch and thereby yieldingly holding the same in its normal inoperative position, said catch being arranged within said casing and having a part extending across and adjacent said inlet port and adapted to be shifted and temporarily held in its operative position by the flow of water therethrough.

7. In a flushing valve, the combination with an inclosing casing having an inlet port at its upper end and an outlet port at its lower end, of an upwardly opening valve arranged within said casing and controlling said outlet port, of manually operable means for opening said valve, a catch device shiftable transversely to the path of movement of said valve and arranged in operative position to engage and positively hold said valve in its open position, said catch having a part extending across and slightly below said inlet port and arranged to be shifted by the flow of water therethrough to its operative position, and counterbalancing means for shifting said catch to its inoperative position out of engagement with said valve.

8. In a flushing valve, the combination with an inclosing casing having inlet and outlet ports, of a valve within said casing and coöperating with said outlet port, a pivotally mounted, swinging support whereon said valve is mounted, a pivoted catch shiftable transversely to the path of movement of said valve support and arranged to engage the same and positively hold said valve in its open position, said catch being arranged adjacent said inlet port and adapted to be shifted by the flow of water therethrough to its operative position, and means for counterbalancing said catch and for shifting the same to its inoperative position.

9. In a flushing valve, the combination with a valve casing having an upper inlet and a lower outlet port, of a valve arranged in said casing for closing said outlet port, a pivoted arm whereon said valve is mounted, means, having a one-way connection with said arm, for manually opening said valve, means for effecting the flow of water through said casing with gradually diminishing pressure, a pivoted catch plate arranged in said casing and extending transversely across and slightly below said inlet port, and counterbalancing means for yieldingly holding said catch plate in its inoperative position, said catch plate being arranged to be actuated by the flow of water through said casing to engage said pivoted arm and positively hold said valve in its open position until the flow of water through the casing has diminished to a certain predetermined point.

10. In a flushing valve, the combination with a valve, a valve casing and means for manually opening said valve, of an automatic catch device having a portion arranged substantially at right angles to the direction of flow through said casing to receive the impact of water and be thereby shifted in the direction of such flow to automatically move said catch device to its operative position in engagement with said valve to thereby positively lock the latter in open position, said catch device being counterbalanced independently of said valve and arranged to shift automatically in the opposite direction back to its normal, inoperative position when the flow through said casing is reduced to a certain predetermined point.

CHARLES H. SHAFFER.

Copies of this patent may be obtained for five cents each, by addressing the "Commissioner of Patents, Washington, D. C."